June 2, 1936.  O. L. HOWLAND  2,042,899
WELDING ROD OR WIRE
Original Filed Jan. 24, 1931
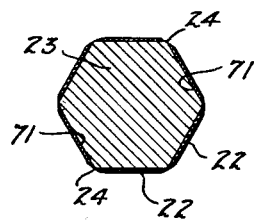
INVENTOR
*Owen L. Howland*
BY
ATTORNEY Patented June 2, 1936

2,042,899

UNITED STATES PATENT OFFICE 2,042,899

WELDING ROD OR WIRE

Owen L. Howland, Chicago, Ill., assignor to Una Welding, Inc., Cleveland, Ohio, a corporation of Delaware Original application January 24, 1931, Serial No. 510,888. Divided and this application September 14, 1935, Serial No. 40,617

1 Claim. (Cl. 219—8)

The present invention relates to welding rod and is a division of my copending application Serial Number 510,888, filed January 24, 1931 which has matured into Patent Number 2,015,074 dated September 24, 1935.

One of the objects of the present invention is to form a welding rod having diffcrent cross sectional diameters in the same plane to form one or more edges substantially throughout the length of the rod and in which the surface of the rod is coated with a flux except the edge or edges.

Other and further objects and advantages will be apparent from the following description, reference being had to the accompanying drawing wherein a preferred form of embodiment of the present invention is clearly shown.

In the drawing:

The single figure is a cross sectional view of the improved rod.

Referring to the drawing, the numeral 23 indicates the rod or wire having fluxing material 22 bound thereto. The wire may be of any desired length or in the form of short rods. It is desirable to form the rod or wire so that it will have a plurality of edges 24 and, as an example, it is formed hexagonally in cross section. The rod or wire is coated throughout the lengths of the flats 71 with a fluxing material, however, the edges 24 are bare so that when the rod or wire is fed through a welding machine, any one or more of these edges will contact with the feed roller or rollers of the machine to provide an electrical contact throughout the length of the rod or wire.

This rod or wire may be made in any desirable manner as for example like that disclosed in my copending application above mentioned.

While the form of embodiment of the present invention as herein disclosed constitutes a preferred form, it is to be understood that other forms might be adopted, all coming within the scope of the claim which follows.

I claim:

As an article of manufacture a welding rod having different cross sectional diameters in the same plane and forming one or more edges or ribs lengthwise of the rod, the surfaces of the rod having fluxing material thereon between the edges, and the edge or edges being bare of such fluxing material.

OWEN L. HOWLAND.